Oct. 10, 1967  C. BERGER  3,346,422
METHOD OF MAKING INORGANIC PERMSELECTIVE MEMBRANES
Filed Nov. 29, 1963
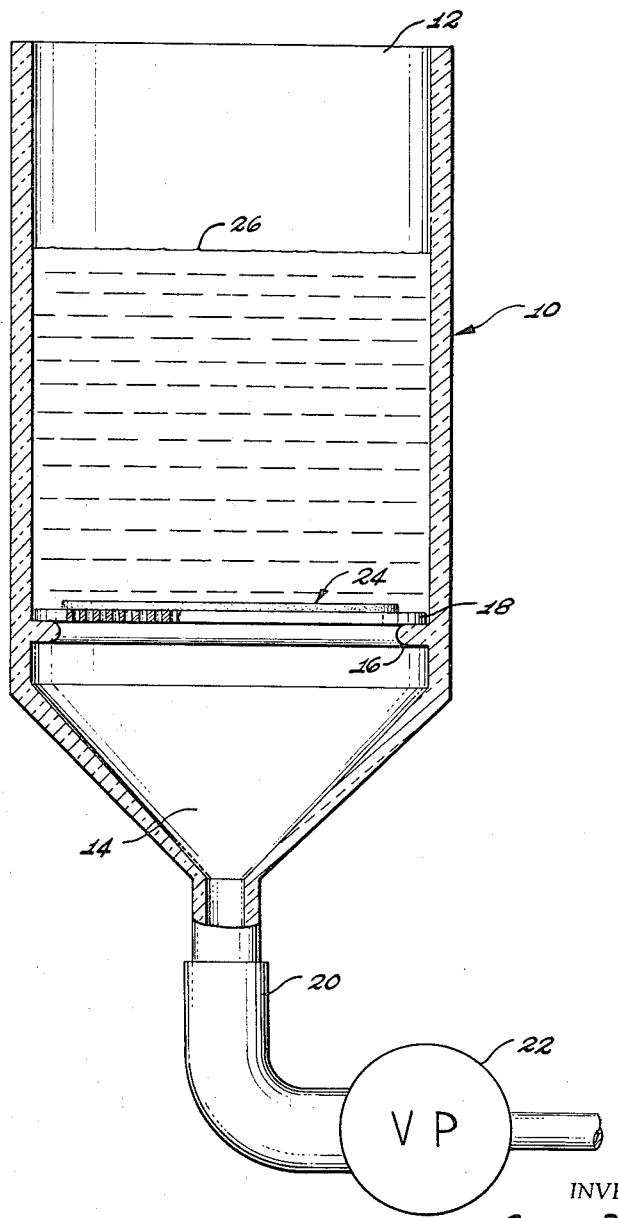
INVENTOR.
CARL BERGER
BY Fulwider, Patton, Rieber
Lee, and Utecht
ATTORNEYS

United States Patent Office 3,346,422
Patented Oct. 10, 1967

3,346,422
METHOD OF MAKING INORGANIC
PERMSELECTIVE MEMBRANES
Carl Berger, Corona Del Mar, Calif., assignor, by mesne assignments, to Douglas Aircraft Company, Inc., Santa Monica, Calif.
Filed Nov. 29, 1963, Ser. No. 326,985
19 Claims. (Cl. 136—148)

My invention relates to improvements in permselective membranes incorporating hydrous metal oxide or acid salt ion exchange materials and, more particularly, to a novel method of preparing a permselective membrane incorporating either a hydrous metal oxide or an acid salt ion exchange material from a permselective membrane incorporating the other form of ion exchange material.

Ion exchange is generally defined as the reversible exchange of ions between a liquid phase and a solid phase unaccompanied by any radical change in the solid structure. The solid structure is the ion exchanger and may be pictured as a network, lattice, or matrix incorporating fixed charge sites each electrically balanced by a counter-ion of the opposite charge type. The counter-ions are readily exchanged for mobile ions of a similar charge type existing in a solution surrounding and permeating the ion exchanger. When the counter-ions are negatively charged, the ion exchanger functions as an anion exchanger. When the counter ions are positively charged, the ion exchanger functions as a cation exchanger.

Because of their ion selective characteristics, ion exchangers find extensive use in industrial processes for demineralizing water and other solvents of soluble ionic contaminants. In such processes, it is preferable to utilize ion exchangers in membrane form. Ion exchange or permselective membranes have the distinct advantage of being able to demineralize soluble ionic contaminants on a continuous basis inasmuch as the ions to be taken from a solution can be selectively screened through the membrane under the influence of an electric field.

Heretofore, the permselective membranes used to demineralize water and other solvents have been organic permselective membranes either of a homogeneous type backed with a supporting material or of a heterogeneous type wherein active ion selective particles are grafted onto a plastic material such as polyethylene or polypropylene. Such organic membranes, however, have numerous critical limitations. Generally, these involve rapid fouling or plugging of the membrane, lack of ability of the membrane to selectively transport specific ions, degradation at elevated temperatures, and high manufacturing costs.

Recently however, various methods have been discovered for forming permselective membranes incorporating hydrous metal oxide and acid salt inorganic ion exchange materials. Such membranes possess the advantages of being substantially free from fouling or plugging, highly selective of specific ions, substantially unaffected by temperatures which break down organic membranes, and relatively inexpensive to produce.

In general, the permselective membranes incorporating hydrous metal oxide or acid salt ion exchange materials are of three basic types, namely homogeneous, gel-filled ceramic and activated ceramic. Homogeneous permselective membranes are defined as those produced by the methods described in my co-pending patent application entitled "Preparation of Hydrous Metal Oxide Membranes and Acid Salts Thereof," by Carl Berger and Frank C. Arrance, Ser. No. 326,709, filed of even date herewith. Briefly, as described therein a homogeneous hydrous metal oxide membrane is prepared by first precipitating the hydrous metal oxide from an aqueous solution. The precipitate is then filtered and dried at a relatively low temperature resulting in an insoluble hydrous metal oxide having a bound water content of more than about 1% and less than about 50% of the total amount of water that could be bound by the particular hydrous metal oxide involved. The hydrous metal oxide thus prepared is then reacted with a cementing substance and pressed and sintered into a permselective membrane. A homogeneous acid salt permselective membrane, on the other hand, is prepared by reaction of a hydrous metal oxide, having an above-specified controlled bound water content, and an acid or salt of an acid. The resulting acid salt is then pressed and sintered to form the acid salt permselective membrane. The homogeneous membranes thus formed are characterized by a low resistivity and a relatively high ion exchange capacity and are therefore ideally suited to use in electrodialysis cells for demineralizing water and other solvents of soluble ion contaminants.

Gel-filled ceramic membranes are formed by the methods described in my co-pending patent application entitled, "Improvements in Inorganic Permselective Membranes," by Carl Beregr, Ser. No. 326,740, filed of even date herewith. Briefly, as described therein, a gel-filled membrane is formed by filling the pores of a strong, porous thin plate or supportive member with a gel of an insoluble hydrous metal oxide or acid salt. The term "filling" encompasses the pressing or sucking of the gel into the pores of the plate member as well as the chemical precipitation of the ion exchange gel within the pores of the member. The gel-filled membrane thus formed has substantially the initial strength of the plate member and the permselectivity of the inorganic ion exchange material. The gel-filled membranes are thus particularly adapted for use in fuel cells and batteries where an extremely strong ion selective membrane is required to maintain ion separation between the electrodes of the battery or fuel cell and wherein operating temperatures may approach and exceed 125° C.

Activated ceramic members are produced by the methods described in the co-pending patent applications which are (1) "Improvements in Inorganic Permselective Membranes" by Carl Berger, Serial No. 327,038, filed of even date herewith, and (2) "Introduction of Ion Exchange Properties Into Inorganic Membranes" by Norman Michael, Ser. No. 327,114, filed of even date herewith. Briefly, an activated ceramic membrane is formed by subjecting a rigid, water-insoluble anhydrous, porous ceramic membrane having no measurable ion exchange capacity to acid or alkaline environment or to a pure steam environment, at high pressure and temperature. The ceramic membrane is formed from either a hydrous metal oxide or acid salt which during formation of the ceramic has been dehydrated. The high pressure, high temperature treatment rehydrates the surfaces and pore walls of the ceramic to form an ion-conductive path through the ceramic membrane which nevertheless has a strong anhydrous inner core. Ceramic membranes, thus activated, are extremely strong and are therefore suitable for use in fuel cells and batteries.

Although in each of the foregoing methods, membranes incorporating hydrous metal oxides or acid salt ion exchange materials may be formed with equal facility, instances have arisen during the manufacture of electrodialysis cells, batteries, and fuel cells where provision has been made for one type of membrane, hydrous metal oxide or acid salt having a specific ion exchange characteristic, whereas and it turns out that a membrane having other ion exchange characteristics is preferable. In some instances the need for the different membrane has been prompted by the necessity of having a permselective membrane of different ion selectivity character, e.g., anion instead of cation or cation instead of anion, while on other occasions the need was simply for a permeselctive membrane having a different resistivity or ion exchange capacity. When faced with these problems, it has frequently been the case that membranes of the required type were not in stock. In such instances it has been necessary to prepare the needed membrane from base materials in accordance with one of the methods described in previously mentioned patent applications. Such preparations have resulted in a material slowing of the manufacturing rate of electrodialysis cells, batteries and fuel cells with a corresponding increase in overall manufacturing expense.

In view of the foregoing, it is a primary object of my present invention to provide a method whereby once having a permeselective membrane incorporating either a hydrous metal oxide or an acid salt, one can quickly and inexpensively produce a membrane therefrom having different ion exchange characteristics.

Another object of my invention is to provide a method for converting a permselective membrane incorporating a hydrous metal oxide ion exchange material to a permselective membrane incorporating an acid salt ion exchange material.

Still another object of my invention is to provide a method for converting a permselective membrane incorporating an acid salt ion exchange material to a permselective membrane incorporating a hydrous metal oxide ion exchange material.

A further object of my invention is to provide a method for converting a perselective membrane incorporating either a hydrous metal oxide or an acid salt having specific ion exchange characteristics to a permselective membrane having other ion exchange characteristics which method is applicable to all membranes formed by the methods described in the previously referred to co-pending patent applications.

These and other objects of my present invention will become clear by referring to the following detailed description and drawing, the single figure of which is a diagrammatic representation of one form of apparatus which may be employed in the method of my invention.

For the purpose of my invention, both in this specification and in the following claims, the term "inorganic ion exchange materials" is limited to insoluble hydrous metal oxides and acid salts thereof and, in general, hydrous metal oxides and acid salts are considered as inorganic ion exchange materials having different ion exchange characteristics.

The term "insoluble hydrous metal oxides" includes those water-insoluble solids containing one or more metal atoms, oxygen atoms, and an indeterminate quantity of water. The hydrous metal oxides do not necessarily have a definite stoichiometric combination or definite crystal structure and may contain ionic impurities. The water-insoluble hydrous metal oxides with which my invention is primarily concerned are the water-insoluble hydrous oxides of metals selected from the following groups of elements in the periodic table: III–A, III–B, IV–A, IV–B, V–A, V–B, VI–B, VII–B, VIII, the lanthanide series and the actinide series. The metals forming insoluble hydrous metal oxides, which are of the greatest practical importance at the present time are: Al (III), Ga (III), In (III), Sc (III), Y (III), Zr (IV), Ti (IV), Hf (IV), Pb (II), Si (IV), Ge (IV), Sn (IV), Sb (III, V), Bi (III), As (V), V (V), Nb (V), Ta (V), Cr (III), Mo (IV, VI), W (IV, VI), Mn (IV), Re (IV), Tc (IV), Fe (III), Co (II), Ni (II), Ac (III), Th (III), U (IV, VI), Pu (IV), La (III), Ce (IV), and Yb (III). Other valences of these elements may also sometimes be employed.

The term "acid salts" includes water-insoluble acid addition products of a hydrous metal oxide or a soluble salt of the metal cation and an acid or a salt of the acid. Preferably, the acids are multivalent oxy-acids, and these acids and salts thereof include an oxygenated anion having a metal selected from the group consisting of P, Si, Ta, Sb, W, B, Nb, As, S, Se, Te, Po, V, and Mo., e.g., phosphoric acid molybdic acid or sodium tungstate.

In general, regardless of the particular method employed to form a permselective membrane incorporating inorganic ion exchange materials, and regardless of its specific structure, I have found that I can quickly and inexpensively produce a permselective membrane incorporating an inorganic material having different ion exchange characteristics by passing a particular aqueous solution through the previously formed membrane.

The step of "passing through" the solution applies to each type of membrane. However, the details of the passage through the different types of membranes varies somewhat in each case. The structure of the homogeneous inorganic ion exchange membrane is essentially solid with micro-pores extending between opposing surfaces of the membrane. Therefore, the passage of the solution is primarily believed to be by diffusion through the membrane with some direct passage through the pores of the membrane. For gel-filled ceramic membranes however, the passage is believed to be entirely by diffusion through the insoluble inorganic ion exchange gel filling the pores of the membrane. In the case of an activated ceramic membrane, on the other hand, the passage of the solution is believed to be directly through the pores of the membrane.

Broadly speaking, in the case of permselective membranes incorporating predominately acid salt ion exchange materials, the solution is basic relative to the acid salt and contains a hydroxyl ion for chemically combining with the acid salt to form a hydrous metal oxide. On the other hand, for most membranes incorporating a predominately hydrous metal oxide ion exchange material of basic character, the solution passed through the membrane is acidic relative to the hydrous metal oxide and preferably includes an oxygenated metal anion capable of chemically combining with a hydrous metal oxide to form an acid salt. In such cases, the solution is preferably an aqueous solution of a water soluble multivalent oxy-acid or salt of the acid. To convert hydrous metal oxides of an acidic character, in particular, insoluble hydrous oxides of the metals of Mo (VI), W (VI), U (VI), Ta (V), Nb (V), Sb (III, V), Sn (IV), Mn (IV), and V (V), to an acid salt, I have found that the solution passed through the membrane should include a water-soluble salt of a metal selected from Group III through Group VIII of the Periodic Table of Elements which will form a basic hydrous metal oxide.

When either an acid is added to a hydrous metal oxide in particulate form, or when a base is mixed with a particulate acid salt, I have found that a substantially complete chemical conversion occurs to change the particulate hydrous metal oxide to an acid salt and the particulate acid salt to a hydrous metal oxide. Therefore, it is indeed surprising that in my invention when the solution is passed through the permselective membranes formed by the methods of the previously described co-pending patent applications, and particularly the homogeneous membranes, the strength of the membranes is not materially altered. Moreover, the resistivity and ion exchange capacity of the resulting membranes are substantially those of like membranes formed by the methods of the aforementioned co-pending patent applications. The reasons for such advantageous results are not entirely understood. However, it is believed that the solution in passing through the original membrane reacts only partially with the inorganic ion exchange material incorporated in the membrane leaving an inner supportive core of the membrane intact. By leaving the inner supportive structure of the membrane intact, the original strength of the membrane is not materially altered while the converted surfaces of the membrane control the membrane's ion exchange characteristics. More particularly, in the case of a homogeneous membrane, only those portions of the membrane contacting the solution as it diffuses therethrough is subject to conversion. This means that only a portion of the solid inorganic ion exchange structure and the walls surrounding the micro-pores of the membrane are converted. In the case of a gel-filled membrane, on the other hand, only the gel is converted while for an activated ceramic membrane only the hydrated surfaces and pore walls are subject to conversion.

The conversion processes of my invention not only modify the resistivity and ion exchange capacity of the original membranes, but also generally result in a membrane having a modified ion selectivity. It has been found that the ion selectivity of some hydrous metal oxide is related to the pH of the solution with which they are in contact. On the acid side of their isoelectric points, certain hydrous metal oxides are anion exchangers, while on the basic side they are cation exchangers. Examples of such hydrous metal oxides are Zr (IV), Sn (IV), Ta (V), Ti (IV), Cr (III), Fe (III), Nb (V), and Al (III). Certain other hydrous metal oxides however, possess predominately cation exchange properties regardless of pH. Examples are Mo (VI), W (VI), U (VI), and V (V). Further, other hydrous metal oxides, such as Th (IV) and Bi (III) have predominately anion exchange characteristics. Acid salts, on the other hand, generally act as cation exchangers. To determine the actual ion selectivity characteristics of the membranes produced by my invention, I placed the resulting membranes in various fuel cells and utilized the membranes as the cells' electrolyte. The permselective membranes incorporating hydrous metal oxide ion exchange materials formed from membranes incorporating an acid salt material where placed in hydrazine-oxygen fuel cells and functioned as hydroxyl ion transport electrolytes while the permselective membranes incorporating acid salt ion exchange materials formed from membranes incorporating hydrous metal oxide material were placed in hydrogen-oxygen fuel cells and functioned as hydrogen ion transport electrolytes. Therefore, it may be generally said, that regarddless of the ion selectivity of the original membrane, the permselective membranes incorporating hydrous metal oxide materials formed in accordance with my invention are anion exchangers while the membranes incorporating acid salt materials are cation exchangers.

Various examples of the methods of my invention for each of the foregoing types of permselective membranes incorporating inorganic ion exchange material follow. For each of the examples, substantially the same apparatus may be employed. One form of such apparatus is illustrated in the drawing. As represented, the apparatus includes a glass tube 10 having an open top 12 and a funnel-shaped open bottom 14 coupled by a flexible tube 20 to a suction pump 22. Extending inward from the inner walls of the tube 10 is an annular support ring 16. The ring 16 provides horizontal support for a highly porous, rigid support plate 18. In operation, a permselective membrane 24 of one of the previously mentioned types is placed upon and supported by the plate 18. The relatively acidic or basic solution 26 is then poured through the open upper end 12 of the tube 14 onto the membrane 24. The suction pump 22 functions to create a vacuum within the funnel-shaped open end of the tube 10 to exert a downward force on the solution 26 through the permselective membrane 24. Under the influence of the suction force, the solution 26 is drawn through the permselective membrane 24 and the pores of the support plate 18. Within the membrane 24, the reagent in the solution reacts with the inorganic ion exchange material incorporated in the membrane to convert the ion exchange material to either a hydrous metal oxide or an acid salt depending upon the original state of the ion exchange material.

In the following examples, approximate resistivity figures are given for each membrane. Since the method of measuring resistivity can vary depending upon the particular system in which the membrane is placed, the resistivity figures given in the examples are not entirely uniform. For instance, in the case of the homogeneous inactivated ceramic membranes, resistivity is given at 90° C. and 60% relative humidity (R.H.). In certain instances extrapolations to 90° C. and 60% R.H. were made to provide this uniform base. For the gel-filled ceramic membranes, on the other hand, resistivity measurements are given after equilibration with water or with a 0.5 M solution of sodium chloride. Due to the high concentration of sodium chloride, the resistivity figures after salt equilibration are generally in the range of 30 to 100 ohm-cm., while the resistivity figures after water equilibration are substantially higher.

CONVERSION OF HYDROUS METAL OXIDES TO ACID SALTS

Group III

*Example I*

Insoluble hydrous $Al_2O_3 \times H_2O$ was formed by dissolving 200 grams of $Al(ClO_3)_3 \cdot H_2O$ in 500 cc. of water and precipitating aluminum hydroxide with $NH_4OH$ at pH 9. The washed and filtered precipitate was dried at 500° C. for 24 hours to form a mixture of $Al_2O_3 \times H_2O$ and alpha monohydrate ($Al_2O_3 \cdot H_2O$). One hundred grams of this material were ball milled with 20 grams of $ZrO_2$ for 18 hours. This mixture was dried for 24 hours at 160° C., granulated and pressed into a 2" diameter membrane 0.30" thick at 15 tons total load. The membrane was sintered for 24 hours at 500° C.

The membrane was amphoteric in its ion selectivity and had an ion exchange capacity of 3.5 meq./gm., a resistivity of 29 ohm-cm. at 90° C. and 60% R.H., and the modulus of rupture of 1,250 p.s.i.

Employing the apparatus illustrated in the drawing, the hydrous aluminum oxide membrane was supported in the tube 10 and one hundred milliliters of 20% phosphoric acid poured into the tube and passed through the membrane. The resulting membrane had an ion exchange capacity of 3.0 meq./gm., a resistivity of 40 ohm-cm., at 90° C. and 60% R.H., a modulus of rupture 910 p.s.i., and functioned as a cation exchanger in a hydrogen-oxygen fuel cell.

*Example II*

One hundred grams of $ScCl_3$ were dissolved in 500 cc. of water. $Sc(OH)_3$ was formed by precipitation with $NH_4OH$ at a pH of 8. The $Sc_2O_3$ was then dried at 200° C. for 24 hours. Twenty grams of $Sc_2O_3$ were mixed with 5 grams of concentrated phosphoric acid and 5 grams of zirconium oxide in a ball mill for 18 hours. The material was dried at 160° C. for 15 hours, granulated and pressed into a 2" diameter membrane at 15 tons total load.

The membrane was anion selective and had an ion exchange capacity of 4.1 meq./gm., a resistivity of 31 ohm-cm. at 90° C. and 60% relative humidity (R.H.), and the modulus of rupture of 1,020 p.s.i.

Employing the apparatus illustrated in the drawing, this hydrous scandium oxide membrane thus formed was supported in the tube 10 and one hundred milliliters of 30% phosphoric acid was poured into the tube over the membrane and drawn through the membrane by suction. The resulting membrane had an ion exchange capacity of 2.9 meq./gm., a resistivity of 60 ohm-cm., a modulus of rupture of 860 p.s.i., and functioned as a cation exchanger in a hydrogen-oxygen fuel cell.

*Example III*

A flame-sprayed aluminum oxide membrane having a resistivity of $3 \times 10^6$ ohm-cm., a modulus of rupture of 6,500 p.s.i., and no ion exchange capacity was supported in a 10 liter autoclave containing 1 liter of water. The alumina membrane was then exposed to steam at 1,000 p.s.i. and approximately 300° C. for 650 hours.

After exposure, the membrane had a resistivity of 75 ohm-cm. at 90° C. and 60% R.H., an ion exchange capacity of 0.7 meq./gm., and a modulus of rupture of 5,200 p.s.i.

Employing the illustrated apparatus, the aluminum oxide membrane thus formed was supported in the tube 10 and 100 milliliters of 20% phosphoric acid poured into the tube and drawn through the membrane under suction. The resulting membrane had an ion exchange capacity of 0.8 meq./gm., a resistivity of 65 ohm-cm., a modulus of rupture of 4,900 p.s.i., and functioned as cation exchanger in a hydrogen-oxygen fuel cell.

*Example IV*

A hydrous gel of scandium oxide was precipitated from an aqueous solution by adding 1.0 M aqueous sodium hydroxide to the solution containing 1.0 M scandium chloride. The hydrous gel was washed and separated from the aqueous solution by decantation and filtration. The pores of the flame-sprayed zirconium membrance having a thickness of 0.7 millimeter and a porosity of 31% were filled with the hydrous oxide gel by first saturating an upper surface of the membrane with the gel and then drawing the gel into the membrane by reducing the pressure below the membrane to approximately 10 microns. The filled membrane was anion selective and had an ion exchange capacity of 1.1 meq./gm., a resistivity after equilibration with 0.5 M sodium chloride at 25° C. of 55 ohm-cm., and a modulus of rupture of 4,350 p.s.i.

The filled membrane was then supported in the tube 10 and one hundred milliliters of 30% phosphoric acid poured into the tube and drawn through the membrane by suction. The resulting membrane had an ion exchange capacity of 1.0 meq./gm., a resistivity after equilibration of 57 ohm-cm., a modulus of rupture of 4,300 p.s.i., and functioned as a cation exchanger in a hydrogen-oxygen fuel cell.

Group IV

*Example V*

$Ti(OH)_4$ was formed by precipitation with $NH_4OH$ from a solution containing 500 g. of $TiCl_3$ and an oxidizing agent, such as $H_2O_2$ at pH 11.

The titanium hydroxide was then heated at 200° C. for 24 hours to convert it to insoluble hydrous titanium dioxide ($TiO_2 \times H_2O$).

One hundred grams of hydrous titanium dioxide were mixed together in a ball mill for 18 hours with 30 grams of phosphoric acid and 30 grams of $ZrO_2$. After ball milling, the mixture was dried in an oven for 15 hours at 160° C. and granulated to a $-32+80$ mesh particle size.

A 2″ diameter by 0.20″ thick membrane was pressed from this mixture at a pressure of 15 tons total load.

The resulting membrane was amphoteric in its ion selectivity and had an ion exchange capacity of 3.2 meq./gm., a resistivity at 90° C. and 60% R.H. of 40 ohm-cm., and a modulus of rupture 950 p.s.i.

Employing the illustrated apparatus, the hydrous titanium dioxide membrane thus formed was supported within the tube 10 and 100 milliliters of a 30% phosphoric acid solution poured over and drawn through the membrane by suction. The resulting membrane had an ion exchange capacity of 2.5 meq./gm., a resistivity of 40 ohm-cm. at 90° C. and 60% R.H., a modulus of rupture 900 p.s.i., and functioned as a cation exchanger in a hydrogen-oxygen fuel cell.

*Example VI*

A frame-sprayed zirconia membrane having a resistivity of $2 \times 10^6$ ohm-cm., a modulus of rupture of 7,500 p.s.i. and no apparent ion exchange capacity was supported in a 10 liter autoclave containing 1 liter of water. The zirconium membrane was exposed to steam at 1,500 p.s.i. and approximately 315° C. for 650 hours.

After exposure to the steam, the membrane had a resistivity of 80 ohm-cm., at 90° C. and 60% R.H., a modulus of rupture of 7,200 p.s.i., and an ion exchange capacity of 0.4 meq./gm. The membrane also exhibited an amphoteric ion selectivity characteristic.

Employing the illustrated apparatus, the activated zirconium membrane was supported in the tube 10 and 100 milliliters of 30% phosphoric acid poured into the tube and drawn through the membrane by suction. The resulting zirconium phosphate membrane had a resistivity of 60 ohm-cm., a modulus of rupture of 4,400 p.s.i., an ion exchange capacity of 0.45 meq./gm. and functioned as a cation exchanger in a hydrogen-oxygen fuel cell.

*Example VII*

The pores of a flame-sprayed zirconia membrane having a thickness of 0.9 millimeter and a porosity of 28% were saturated with an aqueous solution of 1.0 M stannic chloride containing 10% urea and the saturated membrane immersed in the solution for 24 hours at 100° C. At the end of this time the pores of the membrane were filled with a hydrous gel of stannic oxide.

The gel-filled membrane had an ion exchange capacity of 1.3 meq./gm., a resistivity after equilibration with water at 25° C. of 850 ohm-cm., and modulus of rupture of 4,500 p.s.i. The membrane exhibited amphoteric ion selective characteristics.

Employing the illustrated apparatus, the gel-filled membrane was supported in a tube 10 and 200 milliliters of a 10% solution of zirconyl nitrate poured into the tube drawn through the pores of the membrane by suction. The resulting membrane had a resistivity after equilibration of 799 ohm-cm., an ion exchange capacity of 0.9 meq./gm., a modulus of ruptre of 4,300 p.s.i., and functioned as a cation exchanger in a hydrogen-oxygen fuel cell.

Group V

*Example VIII*

Insoluble hydrous antimony trioxide ($Sb_2O_3 \times H_2O$) was prepared by dissolving 200 grams of antimony tribromide in 500 cc. of water and heating the solution for 24 hours at 100° C. The antimony trioxide precipitate thus formed was washed, filtered, and dried for 24 hours at 200° C.

Twenty grams of $Sb_2O_5 \times XH_2O$ were ball milled with 5 grams of concentrated phosphoric acid and 10 grams of $ZrO_2$ for 18 hours. This material was then dried for 15 hours at 160° C., granulated, pressed into a 2″ diameter membrane, 0.20″ thick, at 15 tons total load.

After sintering at 300° C. for 24 hours, the membrane had an ion exchange capacity of 3.3 meq./gm., a resistivity of 35 ohm-cm. at 90° C. and 60% R.H. and the modulus of rupture of 1,050 p.s.i., and exhibited an anion selectivity characteristic.

Employing the illustrated apparatus, the homogeneous membrane was supported in the tube 10 and 100 milliliters of a 1.0 M solution of zirconyl nitrate poured into the tube and drawn through the pores of the membrane by suction. The resulting membrane had an ion exchange capacity of 1.6 meq./gm., a resistivity of 60 ohm-cm. at 90° C. and 60% R.H., a modulus of rupture of 950 p.s.i., and functioned as a cation exchanger in a hydrogen-oxygen fuel cell.

*Example IX*

A membrane 2″ is diameter and 0.02″ thick was prepared from antimony oxide ($Sb_2O_3$) by compacting at 20 tons total load and sintering at 500° C. As fired, the membrane had a resistivity of $2.9 \times 10^6$ ohm-cm. at 90° C. and 60% R.H., a modulus of rupture of 4,500 p.s.i. and no measurable ion exchange capacity. The membrane was supported in a 10 liter autoclave containing 1 liter of water and exposed to steam at 2,000 p.s.i. and approximately 340° C. for 750 hours.

After the exposure to the steam, the membrane had a resistivity of 125 ohm-cm., a modulus of rupture of 4,300 p.s.i., and an ion exchange capacity of 0.3 meq./ gm. The membrane also exhibited anion selectivity characteristics.

Employing the illustrated apparatus, the activated membrane was placed in the tube 10 and 100 milliliters of a 1.0 M solution of zirconyl nitrate poured into the tube and drawn through the pores of the membrane by suction. The resulting membrane had a resistivity of 120 ohm-cm., a modulus of rupture of 4,250 p.s.i., an ion exchange capacity of 0.35 meq./gm., and functioned as a cation exchanger in a hydrogen-oxygen fuel cell.

Example X

A flame-sprayed zirconia membrane having a thickness of 0.7 millimeter and a porosity of 29% was flooded with water. The flooded membrane was made the divider between two compartments, one filled with 1.0 M antimony chloride solution and the other with a 1.0 M nitric acid solution. Diffusion of the reagents into the membrane was allowed to continue for 24 hours. After removal from the diffusion apparatus, the pores of the membrane were filled with a hydrous gel of antimony oxide.

The filled membrane had an ion exchange capacity of 1.0 meq./gm., a resistivity after equilibration with 0.5 sodium chloride at 25° C. of 75 ohm-cm., and a modulus of rupture of 5,300 p.s.i. The membrane also exhibited an anion selectivity characteristic.

Employing the illustrated apparatus, the gel-filled membrane was placed in the tube 10 and 100 milliliters of a 1.0 M solution of zirconyl nitrate poured into the tube and drawn through the membrane by suction. The resulting membrane had an ion exchange capacity of 0.8 meq./cm., a resistivity after equilibration of 80 ohm-cm., a modulus of rupture of 5,000 p.s.i., and functioned as a cation exchanger in a hydrogen-oxygen fuel cell.

Group VI

Example XI

Insoluble hydrous tungsten oxide $WO_3 \times H_2O$ was prepared by dissolving 200 grams of $Na_2WO_4$ in 500 cc. water and precipitating the oxide with HCl at pH 1.5. After washing and filtering, the precipitate was dried for 24 hours at 200° C. to form hydrous $WO_3 \times H_2O$. Twenty grams of $WO_3 \times H_2O$ were ball milled with 5 grams of concentrated phosphoric acid and 5 grams of $ZrO_2$ for 18 hours. This material was dried for 15 hours at 160° C., granulated, pressed into a 2″ diameter membrane .030″ thick, at 15 tons total load and sintered at 300° C. for 24 hours.

The resulting membrane had an ion exchange capacity of 3.0 meq./gm., a resistivity of 38 ohm-cm. at 90° C. and 60% R.H., and the modulus of rupture of 870 p.s.i. The membrane also exhibited a cation selectivity characteristic.

Employing the illustrated apparatus, the homogeneous tungsten oxide membrane was supported in the tube 10 in 100 milliliters of a 20% solution of titanyl chloride poured into the tube and drawn through the membrane by suction.

The resulting membrane had an ion exchange capacity of 2.5 meq./gm., a resistivity of 42 ohm-cm., at 90° C. at 60% R.H., and a modulus of rupture of 800 p.s.i. The membrane also functioned as a cation exchanger in a hydrogen-oxygen fuel cell.

Example XII

A membrane 2″ in diameter and 0.02″ thick was prepared from chromium oxide ($Cr_2O_3$) by compacting at 20 tons total load and sintering at 1,800° C. As fired, the membrane had a resistivity of $2.9 \times 10^6$ ohm-cm., at 90° C. and 60% R.H., a modulus of rupture of 5,000 p.s.i. and no measurable ion exchange capacity. The membrane was supported in a 10 liter autoclave containing 1 liter of water and exposed to steam at 3,000 p.s.i. and approximately 370° C. for 550 hours.

After exposure to the steam the membrane exhibited an amphoteric ion selectivity characteristic and had a resistivity of 90 ohm-cm., a modulus of rupture of 4,700 p.s.i., and an ion exchange capacity of 0.4 meq./gm.

Employing the illustrated apparatus, the activated membrane was supported in the tube 10 and 100 milliliters of a 30% solution of phosphoric acid poured into the tube and drawn through the pores of the membrane by suction. The resulting membrane functioned as a cation exchanger in a hydrogen-oxygen fuel cell and had an ion exchange capacity of 0.45 meq./gm., a resistivity of 85 ohm-cm., and a modulus of rupture of 4,650 p.s.i.

Example XIII

A hydrous gel of tungstic oxide was precipitated from an aqueous solution by adding hydrochloric acid to a 1.0 M solution of sodium tungstate until the pH fell to 1.5. The hydrous gel was washed and separated from the aqueous solution by decantation and filtration. The pores of a flame-sprayed zirconia membrane having a thickness of 0.65 millimeter and a porosity of 32% were filled with the hydrous oxide gel by first saturating an upper surface of the membrane with the gel and then drawing the gel into the membrane by reducing the pressure below the membrane to approximately 10 microns.

The gel-filled membrane exhibited a cation selectivity characteristic and had an ion exchange capacity of 1.2 meq./gm., a resistivity after equilibration with 0.5 M sodium chloride at 25° C. of 40 ohm-cm., and a modulus of rupture of 4,900 p.s.i.

Employing the illustrated apparatus, the gel-filled membrane was supported in the tube 10 and 100 milliliters of a 20% solution of titanyl chloride poured into the tube and drawn through the pores of the membrane by suction. The resulting membrane functioned as a cation exchanger in a hydrogen-oxygen fuel cell and had an ion exchange capacity of 1.0 meq./gm., a resistivity after equilibration of 43 ohm-cm., and a modulus of rupture of 4,800 p.s.i.

Example XIV

Two hundred grams of $Na_3MoO_4$ were dissolved in water and the oxide was precipitated with HCl at pH 2. The precipitate was dried at 200° C. for 24 hours to form hydrous $MoO_3 \times H_2O$.

Twenty grams of hydrous molybdenum oxide $$(MoO_3 \cdot XH_2O)$$

were ball milled with 5 grams of phosphoric acid and 5 grams of $ZrO_2$ for 18 hours. This material was then dried for 15 hours at 160° C., granulated, and pressed into a 2″ diameter, 0.20″ thick membrane at 15 tons total load. After sintering at 300° C. for 24 hours, the membrane exhibited a cation selectivity characteristic and had an ion exchange capacity of 3.1 meq./gm., a resistivity at 90° C. and 60% R.H. of 40 ohm-cm., and the modulus of rupture of 950 p.s.i.

Employing the illustrated apparatus, the homogeneous membrane was placed in the tube 10 and 100 milliliters of a 20% solution of zirconyl chloride poured into the tube and drawn through the pores of the membrane by suction. The resulting membrane functioned as a cation exchanger in a hydrogen-oxygen fuel cell and had an ion exchange capacity of 2.9 meq./gm., a resistivity of 45 ohm-cm., and a modulus of rupture of 700 p.s.i.

Group VII

Example XV

Hydrous manganese dioxide $MnO_2 \times H_2O$ was precipitated from an aqueous solution by adding an 8% solution of manganous chloride to a solution of 2.0 M ammonium hydroxide and 1.0 M bromine. After washing and filtering the precipitate was dried for 24 hours at 200° C.

One hundred grams of $MnO_2 \times H_2O$ were ball milled with 25 grams of $ZrO_2$ and 50 grams of phosphoric acid for 18 hours. This material was dried for 15 hours at 160° C., granulated, pressed into a 2″ disc 0.20″ thick at 15 tons total load and sintered at 300° C. for 24 hours. The resulting membrane exhibited an amphoteric ion selectivity characteristic and had an ion exchange capacity of 3.0 meq./gm., a resistivity of 35 ohm-cm. at 90° C. and 60% R.H., and modulus of rupture of 980 p.s.i.

Employing the illustrated apparatus, the homogeneous membrane was placed in a tube 10 and 100 milliliters of a 1.0 M solution of zirconyl nitrate poured into the tube and drawn through the membrane by suction. The resulting membrane functioned as a cation exchanger in a hydrogen-oxygen fuel cell and had an ion exchange capacity of 2.5 meq./gm., a conductivity of 40 ohm-cm. at 90° C. and 60% R.H., and a modulus of rupture of 860 p.s.i.

*Example XVI*

A membrane 2″ in diameter and 0.02″ thick was prepared from manganese dioxide ($MnO_2$) by compacting at 20 tons total load and sintering at 1,400° C. As fired, the membrane had a resistivity of $2.5 \times 10^6$ ohm-cm. at 90° C. and 60% R.H., a modulus of rupture of 4,300 p.s.i. and no measurable ion exchange capacity. The membrane was supported in a 10 liter autoclave containing 1 liter of water and exposed to superheated steam at 2,300 p.s.i. and approximately 350° C. for 650 hours.

After exposure to the steam, the membrane exhibited an amphoteric ion selectivity characteristic and had a resistivity of 140 ohm-cm., a modulus of rupture of 4,200 p.s.i., and an ion exchange capacity of 0.05 meq./gm.

Employing the illustrated apparatus, the activated ceramic membrane was placed in the tube 10 and 100 milliliters of a 1.0 M solution of zirconyl nitrate poured into the tube and drawn through the pores of the membrane by suction. The resulting membrane functioned as a cation exchanger in a hydrogen-oxygen fuel cell and had a resistivity of 135 ohm-cm., a modulus of rupture of 4,180 p.s.i., and an ion exchange capacity of 0.07 meq./gm.

*Example XVII*

A flame-sprayed zirconia membrane having a thickness of 0.91 millimeter and a porosity of 34% was saturated with water. The saturated membrane was made the divider between two compartments, one filled with an 8% solution of manganous chloride and the other with a solution of 2.0 M ammonium hydroxide and 1.0 M bromine. Diffusion of the reagents into the membrane was allowed to continue for 24 hours. After removal from the diffusion apparatus, the pores of the membrane were filled with a hydrous gel of manganese dioxide.

The filled membrane exhibited an amphoteric ion selectivity characteristic and had an ion exchange capacity of 1.8 meq./gm., a resistivity after equilibration with 0.5 M sodium chloride at 25° C. of 35 ohm-cm., and a modulus of rupture of 4,900 p.s.i.

Employing the illustrated apparatus, the gel-filled membrane was placed in the tube 10 and 100 milliliters of a 1.0 M solution of zirconyl nitrate poured into the tube and drawn through the membrane by suction. The resulting membrane functioned as a cation exchanger in a hydrogen-oxygen fuel cell and had an ion exchange capacity of 1.7 meq./gm., a resistivity after equilibration with 0.5 M sodium chloride at 25° C. of 38 ohm-cm., and a modulus of rupture of 4,800 p.s.i.

Group VIII

*Example XVIII*

Insoluble hydrous ferric oxide $Fe_2O_3 \times H_2O$ was formed by dissolving 200 grams of $Fe(NO_3)_3 \cdot 6H_2O$ in 500 cc. of water and precipitating the hydroxide with $NH_4OH$ at pH 11. After washing and filtering, the precipitate was dried for 24 hours at 200° C. to form hydrous $Fe_2O_3 \times H_2O$ Twenty grams of $Fe_2O_3 \times H_2O$ were ball milled with 9 grams of concentrated phosphoric acid and 9 grams of $ZrO_2$ for 18 hours. This material was dried for 15 hours at 160° C., granulated, and pressed in to a 2″ diameter membrane 0.20″ thick, at 15 tons total load. The membrane was then sintered at 300° C. for 24 hours.

The sintered membrane exhibited an amphoteric ion selectivity characteristic and had an ion exchange capacity of 3.8 meq./gm., a resistivity of 40 ohm-cm. at 90° C. and 60% R.H., and the modulus of rupture of 1,010 p.s.i.

Employing the illustrated apparatus, the homogeneous membrane was placed in the tube 10 and 200 milliliters of the 10% sodium molybdate solution poured into the tube an ddrawn through the membrane by suction. The resulting membrane functioned as a cation exchanger in a hydrogen-oxygen fuel cell and had a resistivity of 45 ohm-cm., an ion exchange capacity of 2.1 meq./gm., and a modulus of rupture of 950 p.s.i.

*Example XIX*

A membrane 2″ in diameter and 0.02″ thick was prepared from ferric oxide ($Fe_2O_3$) by compacting at 20 tons total load and sintering at 1,200° C. As fired, the membrane had a resistivity of $2.8 \times 10^6$ ohm-cm. at 90° C. and 60% R.H., a modulus of rupture of 7,650 p.s.i., and no measurable ion exchange capacity. The membrane was supported in a 10 liter autoclave containing 1 liter of water and exposed to steam at 2,500 p.s.i. and approximately 355° C. for 600 hours.

After exposure to the steam, the membrane exhibited an amphoteric ion selectivity characteristic and had a resistivity of 125 ohm-cm., a modulus of rupture of 7,000 p.s.i., and an ion exchange capacity of 0.1 meq./gm.

Employing the illustrated apparatus, the activated ceramic membrane was placed in the tube 10 and 200 milliliters of a 10% phosphoric acid solution poured into the tube and drawn through the pores of the membrane. The resulting membrane functioned as a cation exchanger in a hydrogen-oxygen fuel cell and had a resistivity at 90° C. and 60% R.H. of 120 ohm-cm., and ion exchange capacity of 0.13 meq./gm., and a modulus of rupture of 6,950 p.s.i.

*Example XX*

The pores of a flame-sprayed zirconium membrane having a thickness of 0.9 millimeter and a porosity of 32% were impregnated with a 1.0 M ferric chloride solution containing 10% urea. The membrane was then immersed in the solution for 24 hours at 90° C. At the end of this time the pores of the membrane were filled with a hydrous gel of ferric oxide.

The gel-filled membrane had an ion exchange capacity of 1.5 meq./gm., a resistivity after equilibration with water 1,650 ohm-cm., and a modulus of rupture of 3,600 p.s.i.

The gel-filled membrane placed in the tube 10 and 200 milliliters of a 10% sodium moylbdate solution drawn through the pores of the membrane by suction. The resulting membrane functioned as a cation exchanger in a hydrogen-oxygen fuel cell and had a resistivity after equilibration with 0.5 M sodium chloride of 45 ohm-cm., an ion exchange capacity of 1.4 meq./gm., and a modulus of rupture of 3,500 p.s.i.

LANTHANIDE SERIES

*Example XXI*

Insoluble hydrous cerium oxide ($Ce_2O_3 \times H_2O$) was prepared by dissolving 200 grams of $Ce(NO_3)_3 \cdot 6H_2O$ in 600 ml. of water and precipitating the hydroxide with $NH_4OH$ at pH 10.

$$Ce(NO_3)_3 + 3NH_4OH \rightleftharpoons Ce(OH)_3 + 3NH_4NO_3$$

After washing and filtering, the precipitate was dried for 24 hours at 200° C. to form $Ce_2O_3 \times H_2O$.

$$2Ce(OH)_3 \rightleftharpoons Ce_2O_3 \times H_2O$$

100 grams of $Ce_2O_3 \times HO$ were ball milled with 10 grams of zirconium oxide and 20 grams of concentrated phosphoric acid for 18 hours. This material was dried for 15 hours at 160° C., granulated, pressed into 2" diameter discs 0.02" thick at 15 tons total load and sintered at 300° C. for 24 hours. The Cerium ion is probably oxidized to +5 valence state, at this point.

These membranes had an ion exchange capacity of 3.6 meq./gm., a resistivity of 35 ohm-cm. at 90° C. and 60% R.H., and a modulus of rupture of 1,012 p.s.i.

Employing the illustrated apparatus, a homogenous membrane thus formed was placed in a tube 10 and 100 milliliters of a 30% solution of phosphoric acid poured into the tube and drawn through the pores of the membrane by suction. The resulting membrane functioned as a cation exchanger in a hydrogen-oxygen fuel cell and had a resistivity of 40 ohm-cm., a modulus of rupture 900 p.s.i., and an ion exchange capacity of 3.1 meq./gm.

*Example XXII*

A hydrous gel of cerric oxide was precipitated by mixing equal volumes of 1.0 cerous chloride and aereating the mixture with oxygen for 24 hours. The pores of a flame-sprayed zirconia membrane having a thickness of 0.88 millimeter and a porosity of 31% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.0 meq./gm., a resistivity after equilibration with 0.5 sodium chloride at 25° C. of 43 ohm-cm., and a modulus of rupture of 4,100 p.s.i.

Employing the illustrated apparatus, the gel-filled membrane was supported in the tube 10 and 100 milliliters of a 20% phosphoric acid solution poured into the tube and drawn through the membrane by suction. The resulting membrane functioned as a cation exchanger in a hydrogen-oxygen fuel cell and had a modulus of rupture of 4,000 p.s.i., a resistivity of 45 ohm-cm., and an ion exchange capacity of 0.9 meq./gm.

*Example XXIII*

A membrane 2" in diameter and 0.02" thick was prepared from cerium oxide ($Ce_2O_3$) by compacting at 20 tons total load and sintering at 300° C. As fired, the membrane had a resistivity of $2.9 \times 10^6$ ohm-cm. at 90° C. and 60% R.H., a modulus of rupture of 8,000 p.s.i. and no measureable ion exchange capacity. The membrane was supported in a 10 liter autoclave containing 1 liter of water and exposed to steam at 2,300 p.s.i. and approximately 350° C. for 450 hours.

After exposure to the steam, the membrane had a resistivity of 180 ohm-cm., a modulus of rupture of 7,100 p.s.i., and an ion exchange capacity of 0.3 meq./gm.

Employing the illustrated apparatus, the activated ceramic membrane was supported in the tube 10 and 100 milliliters of a 20% phosphoric acid solution poured into the tube and drawn through the pores of the membrane by suction. The resulting membrane functioned as a cation exchanger in a hydrogen-oxygen fuel cell had a resistivity of 87 ohm-cm., a modulus of rupture of 7,000 p.s.i., and an ion exchange capacity of 0.2 meq./gm.

ACTINIUM SERIES

*Example XXIV*

Insoluble hydrous thorium oxide ($ThO_2 \times H_2O$) was formed by dissolving 100 grams of $ThCl_4$ in water and precipitating the hydroxide with $NH_4OH$ at a pH 10. The precipitate was washed and filtered and dried at 200° C. for 24 hours to form insoluble hydrous thorium oxide.

Twenty grams of $ThO_2 \times H_2O$ were ball milled with 5 grams of concentrated phosphoric acid and 5 grams of $ZrO_2$ for 18 hours. This material was dried at 160° C. for 15 hours, granulated, and pressed into 2" membranes 0.02" thick, at 15 tons total load. The membranes were sintered at 500° C. for 24 hours.

These membranes had an ion exchange capacity of 3.8 meq./gm., a resistivity of 85 ohm-cm. at 90° C. and 60% R.H., and the modulus of rupture 950 p.s.i.

Employing the illustrated apparatus, a homogeneous membrane thus formed was supported in the tube 10 and 100 milliliters of a 30% phosphoric acid solution poured into the tube and passed through the membrane by suction. The resulting membrane functioned as a cation exchanger in a hydrogen-oxygen fuel cell and had an ion exchange capacity of 3.4 meq./gm., a resistivity of 38 ohm-cm., and a modulus of rupture of 700 p.s.i.

*Example XXV*

A hydrous gel of thorium oxide was precipitated from an aqueous solution by adding 1.0 M sodium hydroxide to a 1.0 M solution of thorium sulfate. The hydrous gel was washed and separated from the aqueous solution by decantation and filtration. The pores of a flame-sprayed zirconia membrane having a thickness of 0.9 millimeter and a porosity of 28% were filled with the hydrous oxide gel by first flooding an upper surface of the membrane with the gel and then drawing the gel into the membrane by reducing the pressure below the membrane to approximately 10 microns.

The gel-filled membrane had an ion exchange capacity of 1.1 meq./gm., a resistivity after equilibration with 0.5 M sodium chloride at 25° C. of 65 ohm-cm., and a modulus of rupture of 4,600 p.s.i.

Employing the illustrated apparatus, the gel-filled membrane was supported in the tube 10 and 100 milliliters of a 30% phosphoric acid solution poured in the tube and drawn through the pores of the membrane by suction. The resulting membrane functioned as a cation exchanger in a hydrogen-oxygen fuel cell and had a resistivity of 60 ohm-cm., an ion exchange capacity of 0.9 meq./gm., and a modulus of rupture of 4,100 p.s.i.

*Example XXVI*

A membrane 2" in diameter and 0.02" thick was prepared from thorium dioxide ($ThO_2$) by compacting at 20 tons total load and sintering at 1,700° C. As fired, the membrane had a resistivity of $2.8 \times 10^6$ ohm-cm. at 90° C. and 60% R.H., a modulus of rupture of 4,300 p.s.i. and no measureable ion exchange capacity. The membrane supported in an autoclave containing a water solution and exposed to superheated steam at 3,000 p.s.i. and approximately 370° C. for 650 hours.

After exposure to the steam, the membrane had a resistivity of 90 ohm-cm., a modulus of rupture of 3,450 p.s.i., and an ion exchange capacity of 0.7 meq./gm.

Employing the illustrated apparatus, the activated membrane was supported in a tube 10 and 100 milliliters of a 30% phosphoric acid solution poured into the tube and drawn through the pores of the membrane by suction. The resulting membrane functioned as a cation exchanger in a hydrogen-oxygen fuel cell and had a resistivity of 95 ohm-cm., a modulus of rupture of 4,250 p.s.i., and an ion exchange capacity of 0.6 meq./gm.

ACID SALTS TO HYDROUS METAL OXIDES

*Example XXVII*

A zirconium phosphate membrane was prepared by ball milling 450 grams of hydrous $ZrO_2$ with 450 grams of concentrated phosphoric acid for 18 hours. This material was dried for 15 hours at 160° C., granulated to −32 +80 mesh particles and pressed into a 2" disc, 0.20" thick, at 15 tons total load and sintered at 300° C. for 24 hours. The membrane had an ion exchange capacity of 4.3 meq./gm.; electrical conductivity was 24 ohm-cm. at 90° C. and 60% R.H. and the modulus of rupture was 3,950 p.s.i.

The homogeneous membrane thus formed exhibited a cation selectivity characteristic and was placed in the tube 10 and 100 milliliters of a 30% solution of potassium hydroxide poured into the tube and drawn into the pores of the membrane by suction. The resulting membrane functioned as an anion exchanger in a hydrazine-oxygen fuel cell and had a resistivity of 30 ohm-cm. at 90° C. and 60% R.H., a modulus of rupture of 3,600 p.s.i. and an ion exchange capacity of 3.9 meq./gm.

*Example XXVIII*

Titanium pyrophosphate ($TiP_2O_7$) was prepared by dissolving 200 grams of titanium chloride ($TiCl_3$) in 500 milliliters of water and precipitating titanium phosphate ($TiPO_4$) with a 1.0 M solution of phosphoric acid at a pH of 3. The precipitate was washed, dried for 24 hours at 110° C., granuated and pressed into a 2" diameter membrane, 0.02" thick at 15 tons total load. The membrane was then sintered at 1,000° C. for 15 hours to form the pyrophosphate. The titanium pyrophosphate membrane thus formed had a resistivity of $1.3 \times 10^4$ ohm-cm., a modulus of rupture of 6,000 p.s.i. and no ion exchange capacity. The membrane was supported in a 10 liter autoclave containing 1 liter of water and subjected to steam at 2,300 p.s.i. and approximately 350° C. for 96 hours.

After exposure to the steam, the membrane exhibited a cation selectivity characteristic and had a resistivity of 125 ohm-cm. at 90° C. and 60% R.H., a modulus of rupture of 5,500 p.s.i. and an ion exchange capacity of 0.65 meq./gm.

The activated ceramic membrane was then placed in the tube 10 and 100 milliliters of a 30% solution of potassium hydroxide poured into the tube and drawn through the pores of the membrane by suction. The resulting membrane functioned as an anion exchanger in a hydrazine-oxygen fuel cell and had a resistivity of 120 ohm-cm. at 90° C. and 60% R.H., a modulus of rupture of 5,450 p.s.i., an ion exchange capacity of 0.7 meq.-gm.

*Example XXIX*

A flame-sprayed zirconium membrane having a thickness of 0.8 millimeter and a porosity of 29% was flooded with water. The flooded membrane was made the divider between two compartments, one containing a mixture of 2.0 M scandium chloride and 2.0 M nitric acid and the other containing a 2.0 M solution of sodium tungstate. Diffusion of the reagents into the membrane was allowed to continue for 24 hours. After removal from the diffusion apparatus the pores of the membrane were filled with a gel of scandium tungstate.

The filled membrane exhibited a cation selectivity characteristic and had a modulus of rupture of 3,700 p.s.i., a resistivity after equilibration of 100 ohm-cm., and an ion exchange capacity of 1.1 meq./gm.

The filled membrane was then placed in the tube 10 and 100 milliliters of a 30% potassium hydroxide solution poured into the tube and drawn through the pores of the membrane by suction. The resulting membrane functioned as an anion exchanger in a hydrazine-oxygen fuel cell and had a resistivity after equilibration with 0.5 M sodium chloride of 114 ohms, an ion exchange capacity of 0.8 meq./gm., and a modulus of rupture of 3,600 p.s.i.

While various methods of manufacture of the permselective membranes incorporating hydrous metal oxides and acid salts have been disclosed, modifications lying within the scope of my invention will become apparent to those skilled in the art. Hence, I intend to be limited only by the claims which follow.

I claim:

1. A method of forming a permselective membrane from a permselective membrane incorporating as inorganic ion exchange material selected from the group consisting of an insoluble hydrous metal oxide and an acid salt thereof, comprising the step of, passing an aqueous solution through said membrane, said solution containing a reagent selected from the group consisting of an acid, a base, and a salt, said reagent being reactive with said ion exchange material to cause said inorganic material to be at least partially converted to an inorganic material having different ion exchange characteristics.

2. A method of forming a permselective membrane incorporating an insoluble hydrous metal oxide ion exchange material from a permselective membrane incorporating an acid salt ion exchange material, comprising the step of, passing an aqueous solution through said membrane, said solution containing a water soluble hydroxide reactive with said acid salt material to form a hydrous metal oxide.

3. A method of forming a permselective membrane incorporating an acid salt ion exchange material from a permselective membrane incorporating a basic insoluble hydrous oxide ion exchange material, comprising the step of, passing an aqueous solution through said membrane, said solution containing an oxygenated metal anion capable of combining with said hydrous metal oxide to form an acid salt.

4. The method of claim 3 wherein said solution contains a soluble salt of an oxy-acid.

5. A method of forming a permselective membrane incorporating an acid salt ion exchange material from a permselective membrane incorporating a basic insoluble hydrous metal oxide ion exchange material, comprising the step of passing an aqueous solution through said membrane, said solution containing a water soluble acid.

6. A method as defined in claim 5 wherein said water soluble acid is a multivalent oxy-acid.

7. The method of forming a permselective membrane incorporating an acid salt ion exchange material from a permselective membrane incorporating an acidic insoluble hydrous metal oxide ion exchange material comprising the step of passing an aqueous solution through said membrane, said aqueous solution containing a soluble salt of a metal selected from Group III through Group VIII of the Periodic Table of the Elements which is capable of forming a basic hydrous metal oxide.

8. A method of forming a permselective membrane from a permselective membrane incorporating an inorganic ion exchange material selected from a group consisting of an insoluble hydrous metal oxide and an acid salt, comprising the steps of:
    rigidly supporting said membrane;
    contacting a surface of said membrane with an aqueous solution containing a reagent selected from the group consisting of an acid, a base and a salt, said reagent being reactive with said ion exchange material to cause said inorganic material to be partially converted to an inorganic material having different ion exchange characteristics;
    and drawing said solution through said membrane.

9. A method of forming a permselective membrane from a homogeneous membrane of an inorganic ion exchange material selected from a group consisting of an insoluble hydrous metal oxide and an acid salt, comprising the step of passing an aqueous solution through said homogeneous membrane, said solution containing a reagent selected from the group consisting of an acid, a base and a salt, said reagent being reactive with said ion exchange material to cause said inorganic material to be partially converted to an inorganic material having different ion exchange characteristics.

10. A method of forming a permselective membrane from a gel-filled ceramic membrane wherein said gel is an insoluble gel of an inorganic ion exchange material selected from a group consisting of an insoluble hydrous metal oxide and an acid salt, comprising the step of passing an aqueous solution through said gel-filled ceramic membrane, said solution containing a reagent selected from the group consisting of an acid, a base and a salt, said reagent being reactive with said ion exchange material to cause said inorganic material to be partially converted to an inorganic material having different ion exchange characteristics.

11. A method of forming a permselective membrane from an activated ceramic membrane having hydrated surfaces and hydrated pore walls of an inorganic ion exchange material selected from a group consisting of an insoluble hydrous metal oxide and an acid salt, comprising the step of passing an aqueous solution through said activated ceramic membrane, said solution containing a reagent selected from the group consisting of an acid, a base and a salt, said reagent being reactive with said ion exchange material to cause said inorganic material to be partially converted to an inorganic material having different ion exchange characteristics.

12. A method of forming a permselective membrane incorporating an insoluble hydrous metal oxide ion exchange material from a permselective membrane incorporating an acid salt ion exchange material, comprising the steps of:
  rigidly supporting said membrane;
  contacting a surface of said membrane with an aqueous solution containing a water-soluble hydroxide reactive with said acid salt material to form a hydrous metal oxide;
  and drawing said solution through said membrane.

13. A method of forming a permselective membrane incorporating an acid salt ion exchange material from a permselective membrane incorporating a basic insoluble hydrous oxide ion exchange material, comprising the steps of:
  rigidly supporting said membrane;
  contacting a surface of said membrane with an aqueous solution containing an oxygenated metal anion capable of combining with said hydrous metal oxide to form an acid salt;
  and drawing said solution through said membrane.

14. A method of forming a permselective membrane incorporating an acid salt ion exchange material from a permselective membrane incorporating a basic insoluble hydrous metal oxide ion exchange material, comprising the steps of:
  rigidly supporting said membrane;
  contacting a surface of said membrane with an aqueous solution containing a water-soluble acid capable of combining with said hydrous metal oxide to form an acid salt;
  and drawing said solution through said membrane.

15. The method of claim 14 wherein said water-soluble salt is a multivalent oxy-acid.

16. A method of forming a permselective membrane incorporating an acid salt ion exchange material from a permselective membrane incorporating an acidic insoluble hydrous metal oxide ion exchange material, comprising the step of:
  rigidly supporting said membrane;
  contacting a surface of said membrane with an aqueous solution containing a soluble salt of a metal selected from Group III through Group VIII of the Periodic Table of Elements which is capable of forming a basic hydrous metal oxide;
  and drawing said solution through said membrane.

17. A method of forming a permselective membrane from a permselective membrane incorporating an inorganic ion exchange material selected from the group consisting of an insoluble hydrous metal oxide and an acid salt, comprising the steps of:
  supporting said membrane across and within a tubular member;
  pouring an aqueous solution on to said membrane, said solution containing a reagent selected from the group consisting of an acid, a base, and a salt, said reagent being reactive with said ion exchange material to cause said inorganic material to be at least partially converted to an inorganic material having different ion exchange characteristics;
  and developing a suction force on a surface of said membrane opposite said solution sufficient to draw said solution through said membrane.

18. A method of forming a permselective membrane incorporating a hydrous zirconium oxide ion exchange material from a permselective membrane incorporating a zirconium acid salt ion exchange material, comprising the step of passing an aqueous solution through said membrane, said solution containing a water soluble hydroxide reactive with said zirconium acid salt to form hydrous zirconium oxide.

19. A method of forming a permselective membrane incorporating a zirconium acid salt ion exchange material from a permselective membrane incorporating a hydrous zirconium oxide ion exchange material, comprising the step of passing an aqueous solution through said membrane, said solution containing a water soluble acid reactive with said hydrous zirconium oxide to form said zirconium acid salt.

References Cited
UNITED STATES PATENTS

| | | | |
|---|---|---|---|
| 2,913,511 | 11/1959 | Grubb | 136—86 |
| 3,056,647 | 10/1962 | Amphlett. | |
| 3,147,149 | 9/1964 | Postal | 136—153 X |

OTHER REFERENCES

Amphlett et al.—"Synthetic Inorganic Ion-Exchange Materials"—J. Inorg. Nucl. Chem., 1958, vol. 6, pp. 220–245, Pergamon Press Ltd., London.

WINSTON A. DOUGLAS, *Primary Examiner.*

D. L. WALTON, *Assistant Examiner.*